(12) United States Patent
Liu (10) Patent No.: US 10,849,368 B2
(45) Date of Patent: Dec. 1, 2020

(54) BREAST CUP ASSEMBLY

(71) Applicant: Regina Miracle International (Group) Limited, Kwai Chung (HK)

(72) Inventor: Zhenqiang Liu, Kwai Chung (HK)

(73) Assignee: Regina Miracle International (Group) Limited, Hong Kong (HK)

( * ) Notice: Subject to any disclaimer, the term of this patent is extended or adjusted under 35 U.S.C. 154(b) by 0 days.

(21) Appl. No.: 16/111,520

(22) Filed: Aug. 24, 2018

(65) Prior Publication Data
US 2019/0125007 A1   May 2, 2019

(30) Foreign Application Priority Data

Oct. 27, 2017   (CN) ..................... 2017 2 1412023 U (51) Int. Cl.
| | |
|---|---|
| *A41C 5/00* | (2006.01) |
| *A41C 3/12* | (2006.01) |
| *A41C 3/08* | (2006.01) |
| *B32B 5/02* | (2006.01) |
| *B32B 5/18* | (2006.01) |
| *B32B 27/06* | (2006.01) |
| *B32B 7/12* | (2006.01) |
| *B32B 27/40* | (2006.01) |
| *B32B 5/24* | (2006.01) |
| *B32B 7/05* | (2019.01) |

(52) U.S. Cl.
CPC .................. *A41C 3/12* (2013.01); *A41C 3/08* (2013.01); *A41C 5/005* (2013.01); *B32B 5/02* (2013.01); *B32B 5/18* (2013.01); *B32B 5/245* (2013.01); *B32B 7/05* (2019.01); *B32B 7/12* (2013.01); *B32B 27/065* (2013.01); *B32B 27/40* (2013.01); *B32B 2437/00* (2013.01)

(58) Field of Classification Search
CPC .............. A41C 3/12; A41C 3/08; A41C 5/005
USPC ........................................................... 450/39
See application file for complete search history.

(56) References Cited

U.S. PATENT DOCUMENTS

| | | | | |
|---|---|---|---|---|
| 7,407,427 | B2* | 8/2008 | Liu .......................... | A41C 3/00 450/39 |
| 8,956,199 | B2* | 2/2015 | Liu ......................... | A41C 3/146 450/38 |
| 2003/0092355 | A1* | 5/2003 | Rabinowicz ......... | A41C 3/0014 450/1 |
| 2004/0106354 | A1* | 6/2004 | Falla .................... | A41C 3/0007 450/41 |
| 2008/0153388 | A1* | 6/2008 | Liu .......................... | A41C 3/00 450/39 |
| 2008/0268748 | A1* | 10/2008 | Huang ................. | A41C 3/0014 450/39 |
| 2010/0124869 | A1* | 5/2010 | Liu .......................... | A41C 3/10 450/39 |

(Continued)

*Primary Examiner* — Gloria M Hale
(74) *Attorney, Agent, or Firm* — Kaplan Breyer Schwarz, LLP (57) ABSTRACT

A breast cup assembly including an outer fabric layer, an inner fabric layer, and a molded core assembly having two cup regions and disposed between the outer and inner fabric layers, the core assembly including an inner core foam layer laminated with an outer core fabric layer. Each of the inner and outer fabric layers may have a range greater than the extent of the core assembly, and the inner core foam layer at each of the two cup regions of the core assembly has varying thickness but substantially the same density across the cup region.

12 Claims, 13 Drawing Sheets

(56) References Cited

U.S. PATENT DOCUMENTS

2011/0092935 A1* 4/2011 Hann ............... A61F 13/47236
604/367

* cited by examiner

BREAST CUP ASSEMBLY

CROSS-REFERENCE TO RELATED APPLICATIONS

This application claims foreign priority to and the benefit of Chinese Patent Application No. 201721412023.9, filed on 27 Oct. 2017, the entire disclosure of which is incorporated herein by reference.

FIELD OF THE PRESENT DISCLOSURE

The present invention relates to a breast cup assembly for a brassiere, a bra top or a sports bra, and methods of making the same.

BACKGROUND

The shape of the bra cup or bra cup assembly is typically formed by molding a foam material of uniform thickness to the desired 3D shape. The cup so formed by molding usually has a higher density in a thinner region and a lower density in a thicker region. Regions having higher density are generally harder than regions having lower density. Such varying hardness is undesirable. In addition, most bra cups are provided with additional pads such as foam pads within the cup, and the precise positioning of such pads during manufacture of the bra cup is difficult.

SUMMARY

According to an aspect of the present invention, there is provided a breast cup assembly comprising an outer fabric layer, an inner fabric layer, and a molded core assembly that has two shaped cup regions and that is disposed between the outer and inner fabric layers, the core assembly comprising a core foam layer disposed on the inner side laminated with a core fabric layer disposed on the outer side. The core foam layer at each of the two cup regions of the core assembly has varying thickness but substantially the same density across the cup region. The molded core assembly is shaped into 3D shape by molding.

Preferably, each of the inner and outer fabric layers may have an extent greater than the extent of the core assembly.

Preferably, each of the cup regions has a first thickness at a central portion of the cup region and a second thickness that decreases from the central portion to a periphery of the cup region. The first thickness is preferably the maximum thickness of the cup region.

Alternatively, each of the shaped cup regions has a maximum thickness at an apex of the cup region, and the thickness of the cup region gradually decreases from the apex to a periphery of the cup region.

Preferably, the entire inner surface of the molded core assembly is affixed to the inner fabric layer.

Preferably, the breast cup assembly further comprises a thermoplastic polyurethane (TPU) film disposed between the molded core assembly and the inner fabric layer, the TPU film being adapted to affix the core assembly to the inner fabric layer.

Preferably, the outer fabric layer and the inner fabric layer are affixed to each other at their periphery only.

Preferably, the outer fabric layer and the molded core assembly are not affixed to each other.

Preferably, the outer fabric layer and the molded core assembly are affixed to each other only at a bridge or connecting region between the two cup regions.

Preferably, the inner fabric layer comprises a one-piece fabric layer.

According to another aspect of the present invention, there is provided a brassiere comprising the breast cup assembly as hereinbefore mentioned, wherein the inner and outer fabric layers include side wings of the brassiere, and fasteners attached to the ends of the side wings.

According to yet another aspect of the present invention, there is provided a brassiere comprising the breast cup assembly as hereinbefore mentioned, a side wing attached to either end of the breast cup assembly, and fasteners attached to the end of each side wing.

According to still another aspect of the present invention, there is provided a bra top or a sports bra comprising a front portion comprising the breast cup assembly as hereinbefore mentioned, and a back portion attached to the front portion.

According to still another aspect of the present invention, there is provided a method of making a breast cup assembly, the method comprising: joining a core foam layer on the inner side to a core fabric layer on the outer side; skiving the core foam layer to form a 3D-shaped core assembly having two raised cup regions, each cup region having a maximum thickness at the central region thereof and a decreasing thickness which gradually decreases from the central region to an edge of the cup region; molding the core assembly; attaching an inner fabric layer to the molded core assembly such that the entire inner surface of the molded core assembly is attached to the inner fabric layer; attaching an outer fabric layer to the inner fabric layer at each other's periphery only, with the molded core assembly being disposed between the outer and inner fabric layers.

Preferably, the step of molding the core assembly comprises molding the core assembly between a convex mold portion and a concave mold portion, with the raised cup regions and the core foam layer facing the convex mold portion.

Preferably, each of the inner and outer fabric layers has an extent that exceeds the extent of the molded core assembly.

Preferably, the density of the core foam layer at each of the cup regions is substantially constant across the cup region.

Preferably, the method further comprises the step of attaching side wings to the breast cup assembly and fasteners to the side wings to form a brassiere.

Preferably, the inner and outer fabric layers each has a length long enough to include the side wings of the brassiere that comprises the breast cup assembly.

The breast cup assembly provided in accordance with the present invention provides improvement at least in comfort and aesthetics.

DETAILED DESCRIPTION

For a better understanding of the present invention, the technical solutions of the present invention will be described below in conjunction with the exemplary embodiments with reference to the accompanying drawings.

Figure 1:
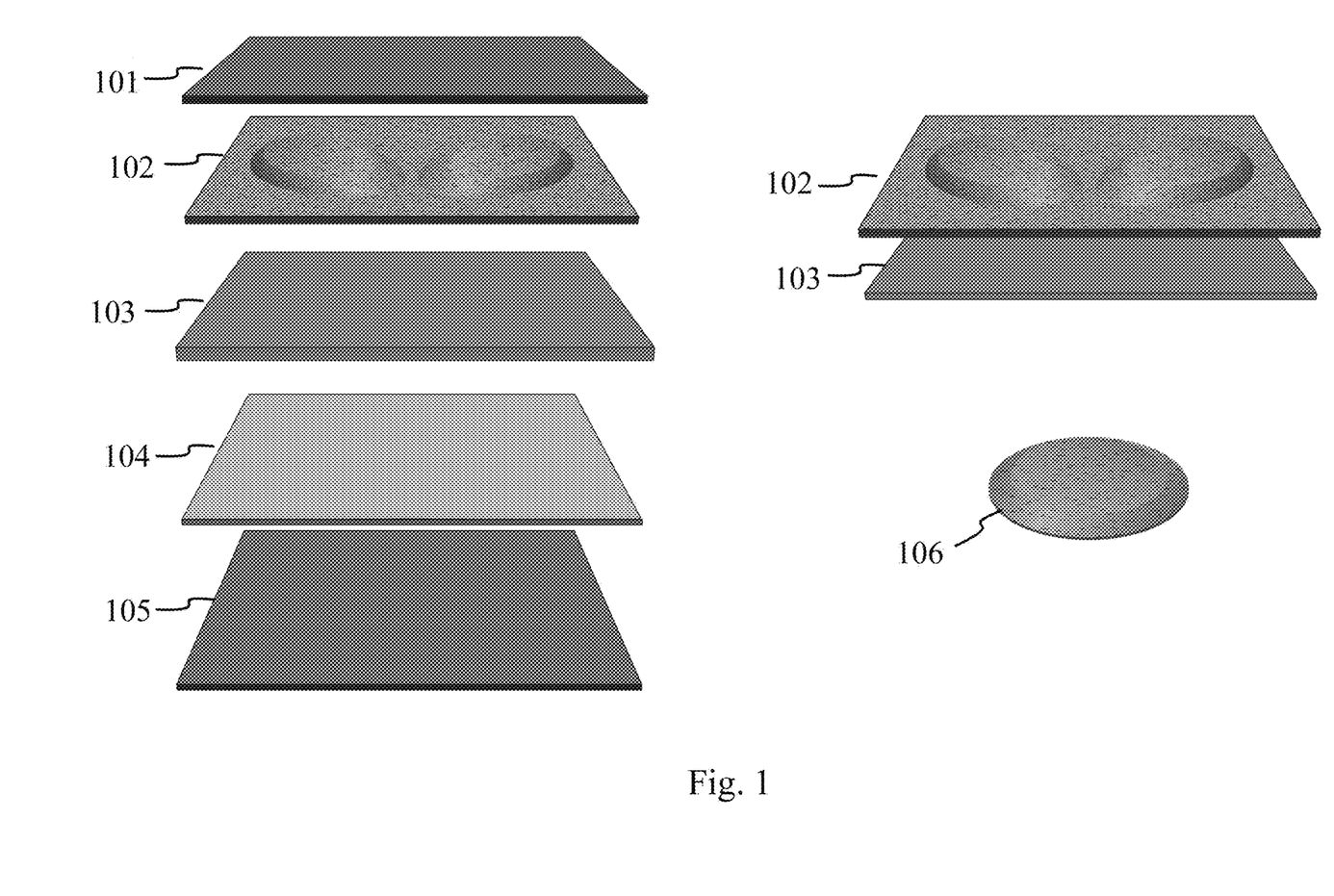
FIG. 1 illustrates the materials used in a breast cup assembly made in accordance with an embodiment of the present invention.

FIG. 1 illustrates the materials used in a brassiere made in accordance with an embodiment of the present invention. As shown, the materials used in this embodiment include an outer fabric layer 101, a core assembly comprising a core foam layer 102 disposed on the inner side laminated with a core fabric layer 103 disposed on the outer side, a thermoplastic polyurethane (TPU) film 104, and an inner fabric layer 105. Each of the outer fabric layer 101, the core foam layer 102, the core fabric layer 103, and the inner fabric layer 105 has a range or an extent greater than the extent of the two cups of the bra. That is, the two cups of the bra are within the range defined by the left and right edges of each of the outer fabric layer 101, the core foam layer 102, the core fabric layer 103, and the inner fabric layer 105. In the present invention, both "inner" and "outer" are defined with respect to the body of the wearer. The inner layer refers to the layer on the inside of the bra, i.e. the layer on the side closer to the body of the wearer, while the outer layer is the layer on the outside of the bra, i.e. the layer on the side away from the body of the wearer.

Figure 2:
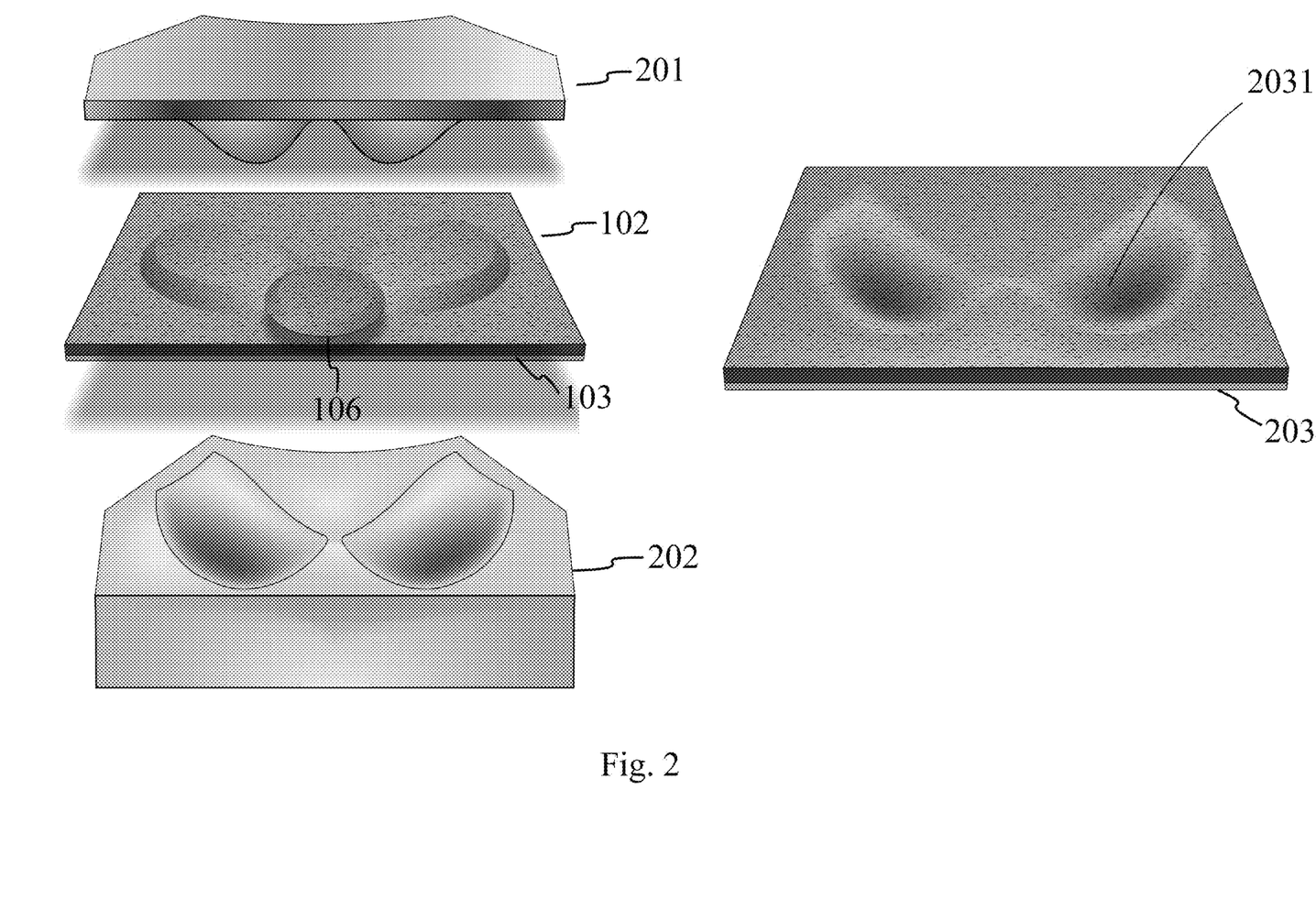
FIG. 2 illustrates an apparatus for manufacturing a breast cup assembly and a process of molding and shaping a core assembly in accordance with an embodiment of the present invention.

In accordance with an embodiment of the present invention, the core assembly is formed by laminating a precursor core foam layer and a precursor core fabric layer. The core foam layer 102 forming the resultant core assembly has a desired or predetermined shape and contour of thickness formed by skiving or cutting through the precursor core foam layer 102. The skiving or cutting process can be done, for example, manually or by machine. To form the core assembly, a piece of fabric and a block of foam which is initially of uniform thickness are first bonded or laminated to each other. Then the fabric-foam laminate, or, specifically, the core foam layer in the fabric-foam laminate, is skived to achieve the desired or predetermined shape and thickness distribution of the fabric-foam laminate. After the skiving process, the core foam layer 102 is no longer of uniform thickness but is of varying thickness thereby forming a 3D shape. As illustrated in FIGS. 1 and 2, the core foam layer 102 has varying thickness and has two raised portions or regions on one side, preferably the inner side, of the core assembly. The raised portions or regions correspond to and define the two cups of the bra to be formed. For each raised portion, the thickness gradually decreases from the raised portion to the edge thereof. The core foam layer 102 comprising two raised portions corresponding to the two cups of the bra is a single piece of foam, so that the two cups are formed on a single piece of foam layer 102. In one embodiment, as illustrated in FIG. 1, each of the two raised portions is substantially circular, and the central region of each raised portion has a substantially uniform thickness, while at the edge region of the raised portion, the thickness decreases or tapers towards the edge of the raised portion, until the edge where the thickness flushes with the non-raised region of the core foam layer 102. In other embodiments, each raised portion may have a thickness that tapers slightly in the middle portion and a thickness that gradually decreases in the edge region. In yet other embodiments, the thickness of each raised portion can also be appropriately adjusted as needed. Alternatively, an additional foam pad 106 may be provided on the outer side or the inner side of the connecting region or the bridge between the two raised portions.

FIG. 2 illustrates an apparatus and a process of molding a core assembly according to an embodiment of the present invention. In the embodiment shown in FIG. 2, an optional additional foam pad 106 is placed over the connecting region or the bridge between the two raised portions. As shown, a molding apparatus including a convex mold portion 201 and a concave mold portion 202 can be used. The convex mold portion 201 and the concave mold portion 202 together define a shape corresponding to the desired cup shape of the bra to be formed. The core foam layer side of the core assembly is placed facing the convex mold portion 201, and the two raised portions face, and are aligned with the cup shape of, the convex mold portion. An additional foam pad 106 is optionally placed over the connecting region between the two raised portions. By closing the convex mold portion 201 and the concave mold portion 202, and upon the application of heat and pressure, a precursor molded core assembly 203 comprising two cup regions is formed. The precursor molded core assembly 203 has two cup regions that correspond to and define the two cups of the bra to be formed. The two cup regions also correspond to the two raised portions of the core assembly which itself comprises the core foam layer 102 and the core fabric layer 103 laminated to each other. According to an embodiment, the desired shape of each of the two cup regions of the precursor molded core assembly 203 is formed without forced compression of the core foam layer corresponding to the cup region, while maintaining the desired shape of the cup region. This is possible because of the increased thickness of the raised portion of the core foam layer compared with the rest, i.e. the non-raised region, of the core foam layer. The increased thickness of the raised portion, which is formed by skiving the precursor foam block, substantially defines the shape of the cup region, without the need to force compress the core foam layer corresponding to the cup region. The result is that while the cup region has varying thickness, with the thickness being maximum at the central region or apex of the cup region while gradually decreasing from the central region or apex towards the edge of the cup region, the density of the core foam layer remains substantially constant. This helps prevent varying foam densities across the cup leading to possible variation of hardness across the cup which could be undesirable. In conventional molding of a bra cup, a block of foam of substantially uniform thickness is typically subjected to compression and molding to from the desired cup shape. Such compression may cause varying densities and hence varying hardness across the resultant cup so formed and such varying hardness could be undesirable. In FIG. 2, the shaped concave surface 2031 of the precursor molded core assembly 203 is shown.

Figure 3:
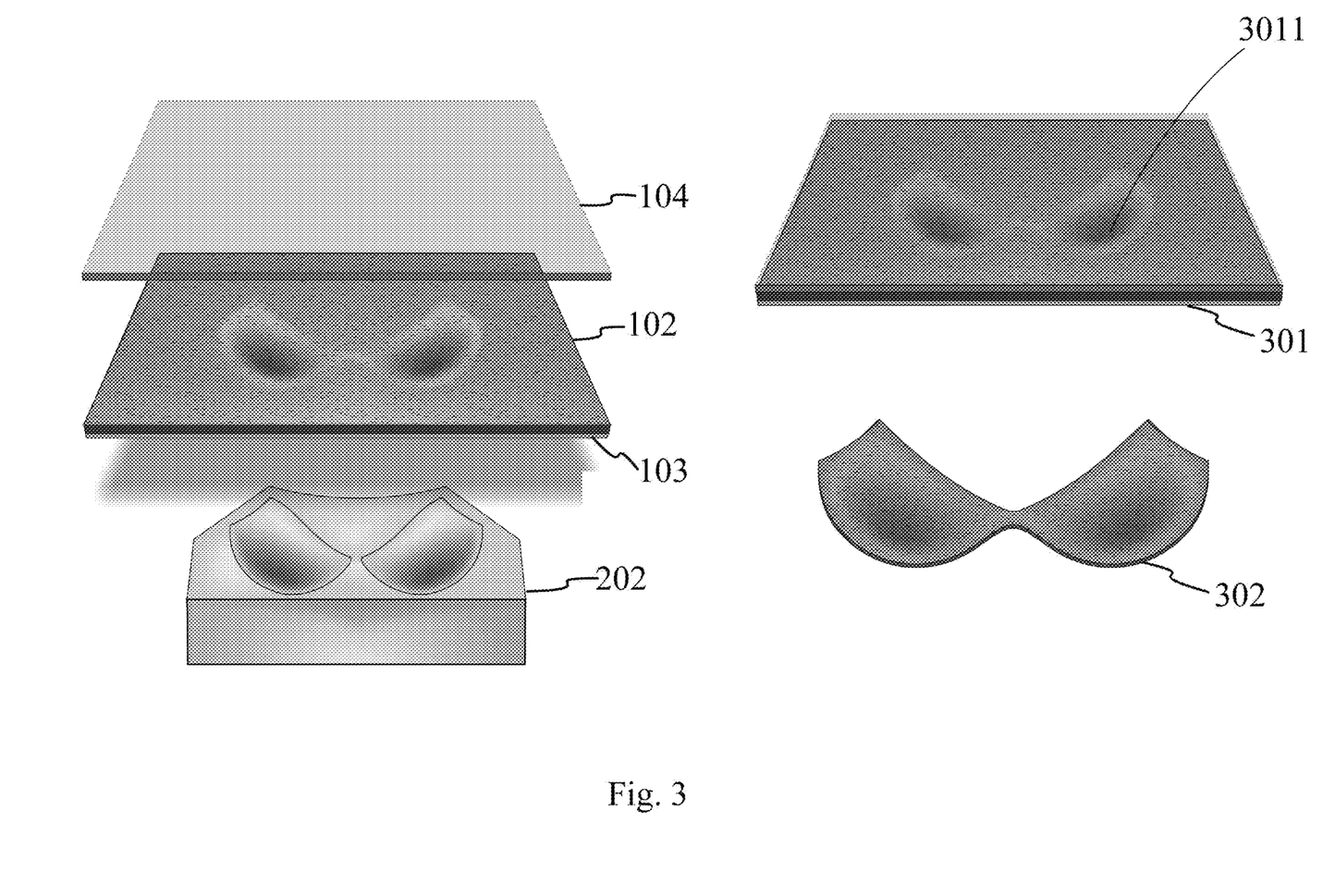
FIG. 3 illustrates a process for attaching a thermoplastic polyurethane (TPU) film onto a molded core assembly in accordance with an embodiment of the present invention.

FIG. 3 illustrates a process for vacuum forming a thermoplastic polyurethane (TPU) film onto the precursor molded core assembly 203 in accordance with an embodiment of the present invention. The TPU film 104 is placed over the core foam layer side of the precursor molded core assembly, and is attached to the core foam layer side of the precursor molded core assembly by, for example, vacuuming forming over the concave mold portion 202 upon the application of heat. After that, the assembly 301 of precursor molded core assembly 203 with TPU film 104 attached on the core foam layer side is trimmed to obtain the molded core assembly 302. In FIG. 3, a concave surface 3011 of a cup region of the assembly 301 is shown. The trimmed molded core assembly 302 comprises an outer core fabric layer 103 laminated with an inner core foam layer 102, and comprises the two cups of desired shape of the bra to be formed. A TPU film 104 is attached to the inner or concave side of the molded core assembly 302.

Figure 4:
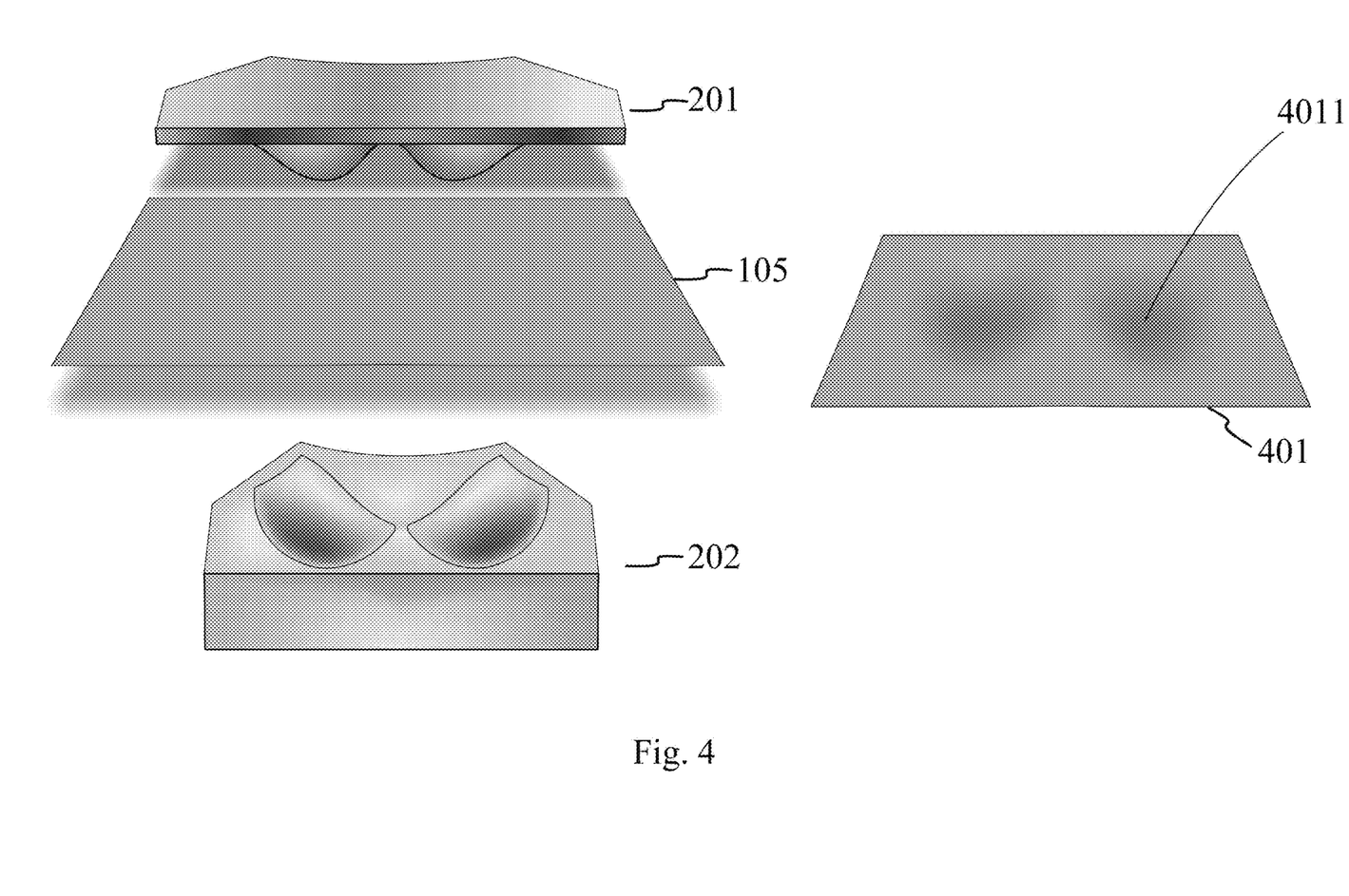
FIG. 4 illustrates a process for molding an inner fabric layer in accordance with an embodiment of the present invention.

FIG. 4 illustrates a subsequent process of molding an inner fabric layer. As shown, the inner fabric layer 105 is placed between the convex mold portion 201 and the concave mold portion 202. By closing the mold portions and applying heat and pressure, a shaped or molded inner fabric layer 401 comprising two cup regions thereof is formed. In FIG. 4, a concave surface 4011 of a cup region is shown.

Figure 5:
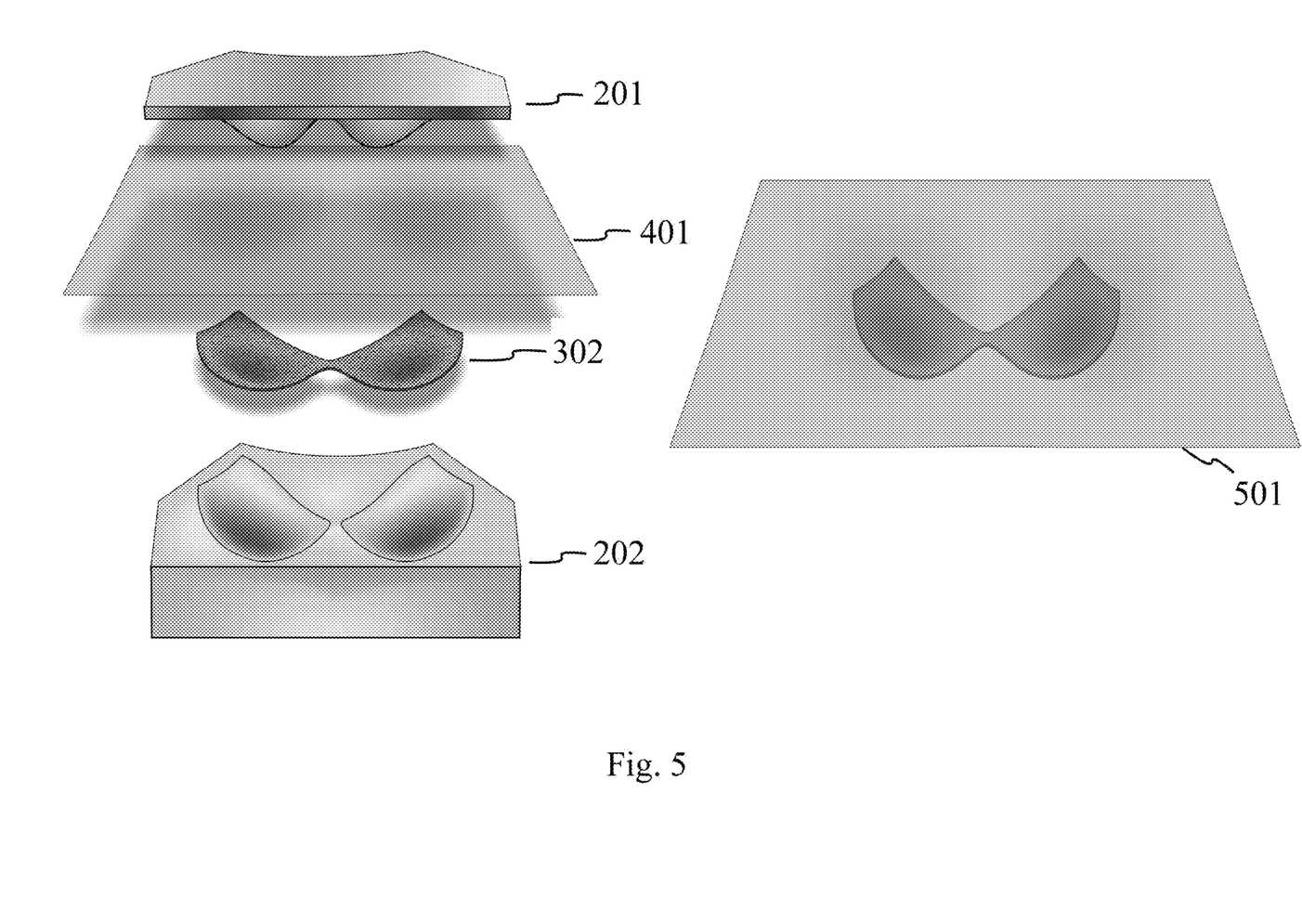
FIG. 5 illustrates a process for joining a trimmed molded core assembly and a molded inner fabric layer in accordance with an embodiment of the present invention.

FIG. 5 illustrates a subsequent process of attaching the molded inner fabric layer 401 to the molded core assembly 302. As shown, the molded core assembly 302 and the molded inner fabric layer 401 are placed between the convex mold portion 201 and the concave mold portion 202. The molded inner fabric layer 401 is on the side adjacent the convex mold portion 201, while the molded core assembly 302 is on the side adjacent the concave mold portion 202, with the fabric layer side of the molded core assembly 302 facing the concave mold portion 202. The extent or span of the inner fabric layer 401 is greater than the range or extent of the molded core assembly 302 so that the entire molded core assembly comprising two cup regions is within the boundaries of the inner fabric layer 401. By closing the convex mold portion 201 and the concave mold portion 202 and the application of heat and pressure, the assembly 501 of the molded core assembly 302 with the molded inner fabric layer 401 attached thereto on the inner side or the core foam layer side is formed. During the molding process, the TPU film is softened upon the application of heat, and after cooling, the inner fabric layer 401 is attached or bonded to the molded core assembly on the inner side thereof, i.e. on the core foam layer side. Such bonding of the inner fabric layer 401 to the core foam layer 102 of the molded core assembly 302 does not require the use of any adhesive, thereby helping to improve wearing comfort and helping to avoid creases appearing after repeated washing cycles.

Figures 6A, 6B:
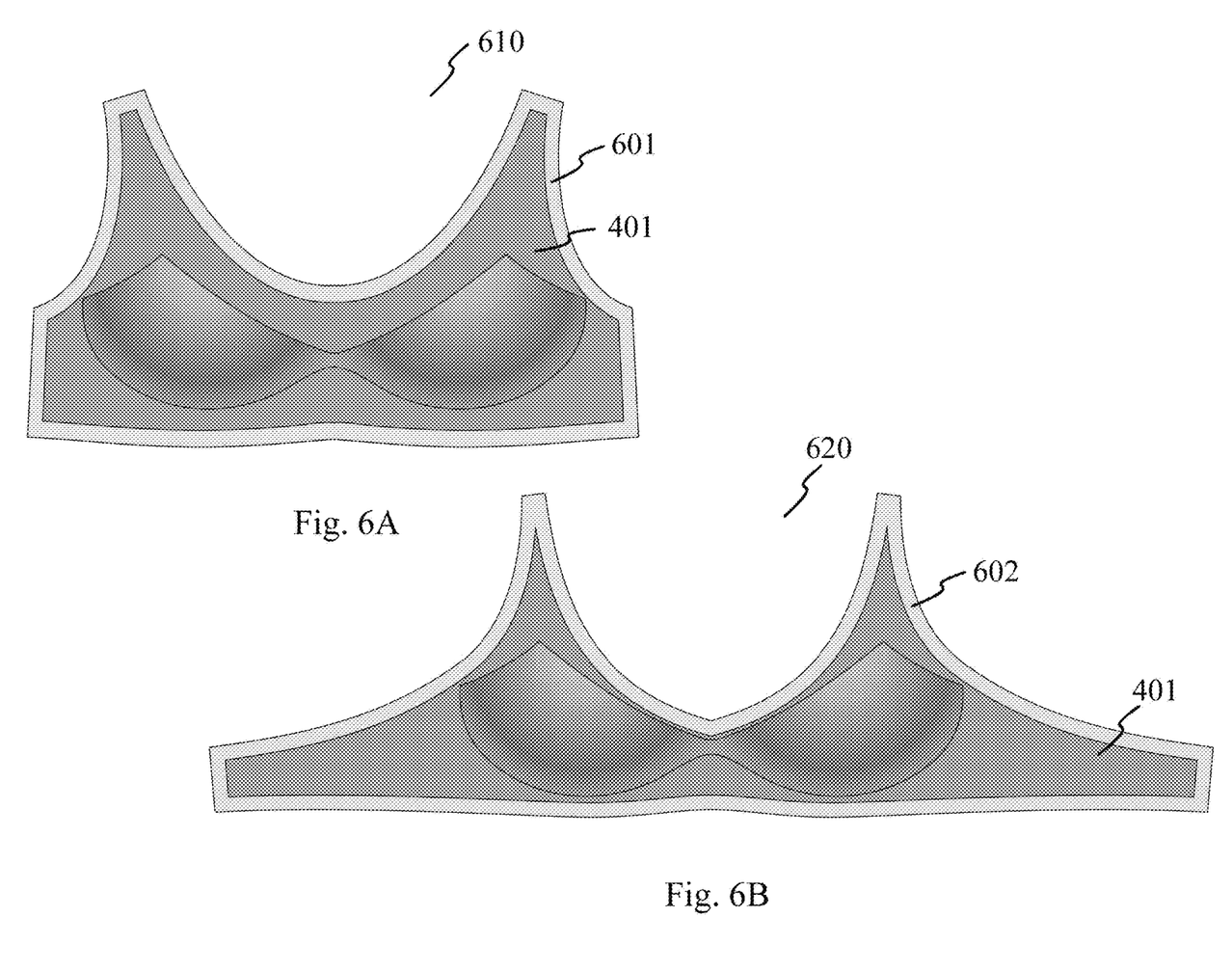
FIG. 6A shows a molded core assembly attached to a trimmed inner fabric layer in accordance with an embodiment of the present invention.
FIG. 6B shows a breast cup assembly attached to a trimmed inner fabric layer in accordance with another embodiment of the present invention.

The molded core plus inner layer assembly 501 is then trimmed. The trimming may be such that the trimmed assembly has the inner fabric layer 401 extending over a range long enough to include both the left side wing and the right side wing of the bra to be formed, such as the trimmed assembly 620 as shown in FIG. 6B. In this case, only the inner fabric layer 401 extends long enough to include the side wings on both left and right sides, but the molded core assembly does not extend to the side wing positions. Trimming of the molded core plus inner layer assembly may also be such that the inner fabric layer of the trimmed assembly does not extend to include the side wings, such as the trimmed assembly 610 as shown in FIG. 6A. In this case, the side wings may be subsequently attached to the inner layer by sewing or seamless means. FIG. 6A also shows the application of adhesive tapes 601 to the periphery of the inner layer on its outer side. FIG. 6B also shows the application of adhesive tapes 602 to the periphery of the inner fabric layer on its outer side. The adhesive tapes will subsequently attach an outer fabric layer to the inner fabric layer. Other means of attaching the outer fabric layer to the inner fabric layer are possible.

Figure 7A:
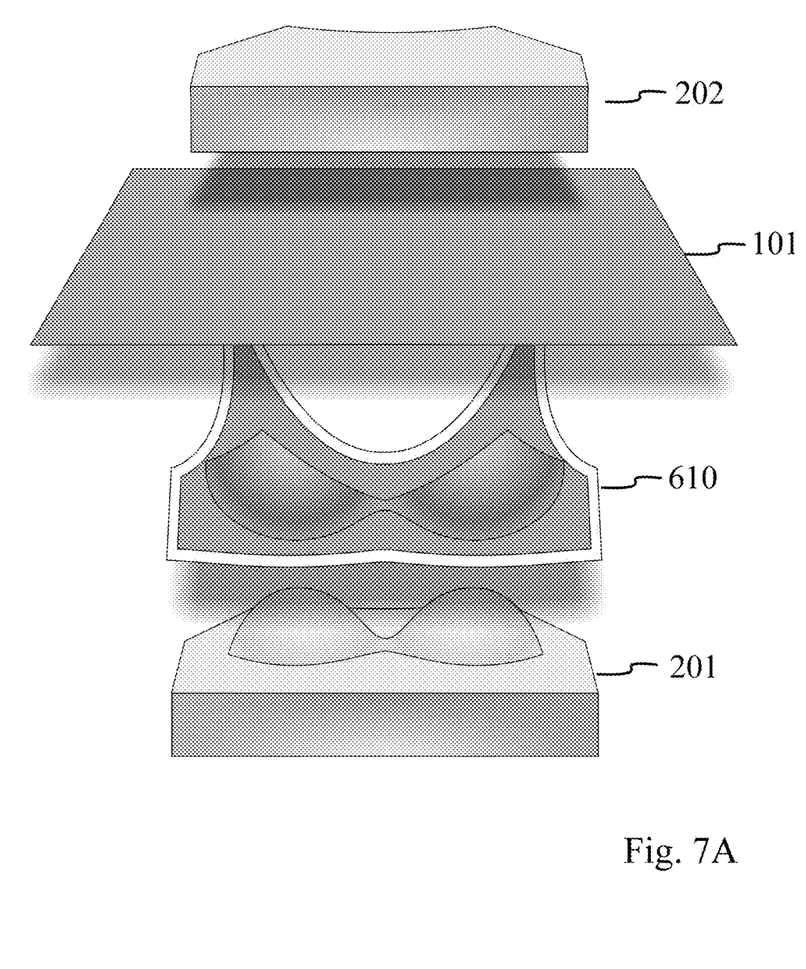
FIG. 7A illustrates a process of joining an outer fabric layer to the assembly of FIG. 6A in accordance with an embodiment of the present invention.
Figure 8A:
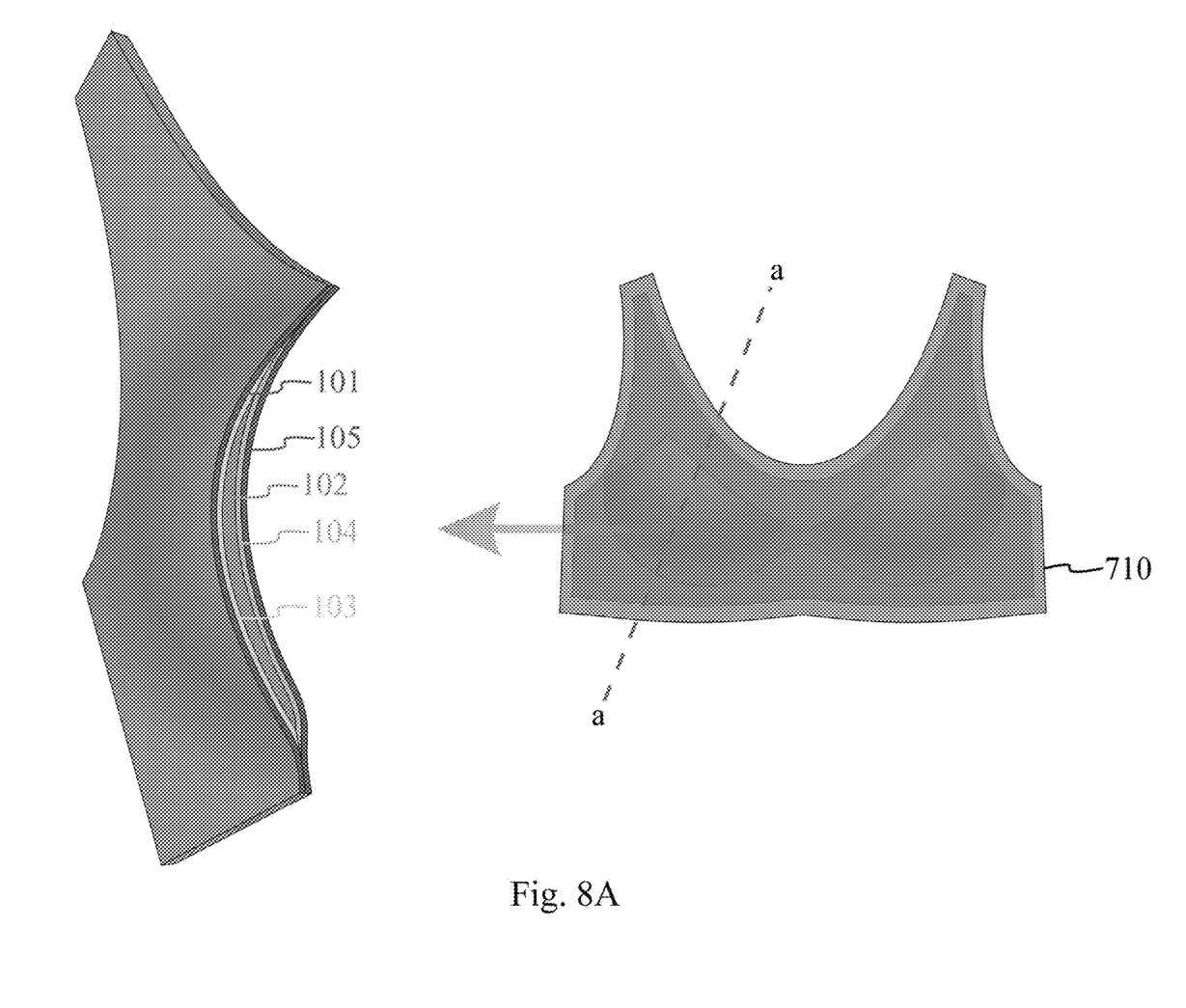
FIG. 8A shows a cross-sectional view along the line a-a of the assembly of FIG. 7A.
Figure 9A:
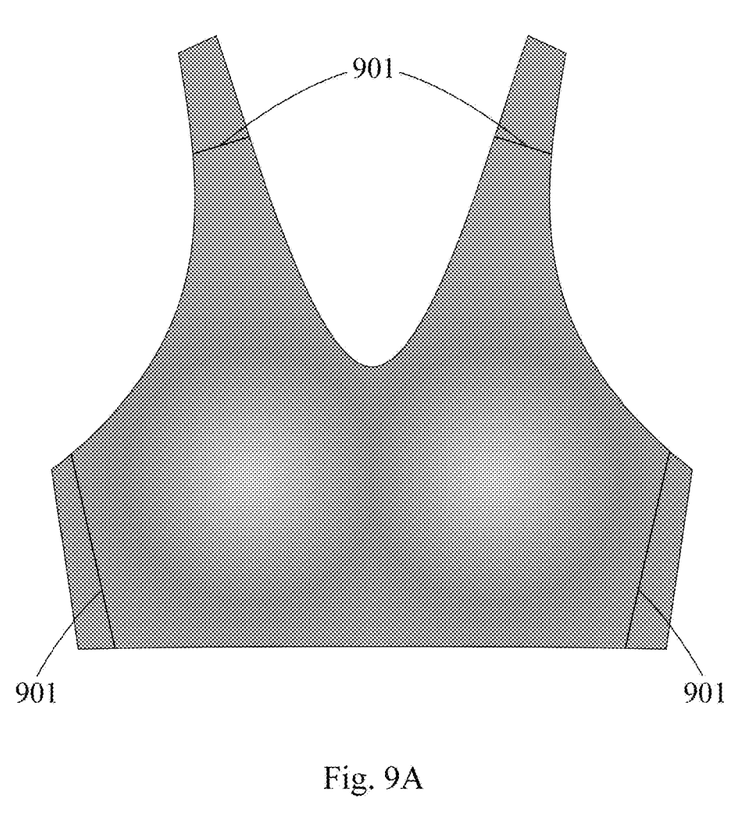
FIG. 9A shows the front view of a bra top or sports bra in accordance with an embodiment of the present invention.
Figure 9B:
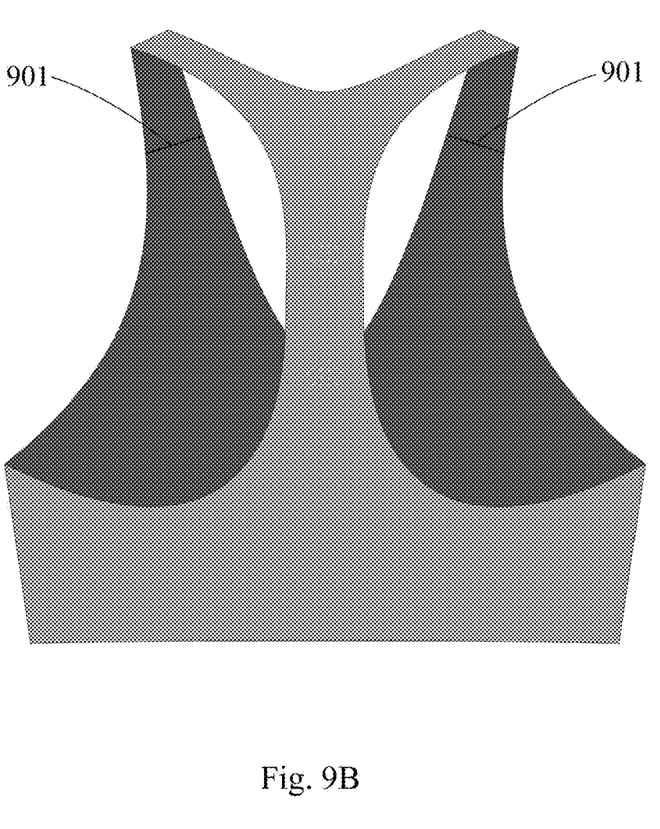
FIG. 9B shows the back view of the bra top of FIG. 9A.
Figure 10A:
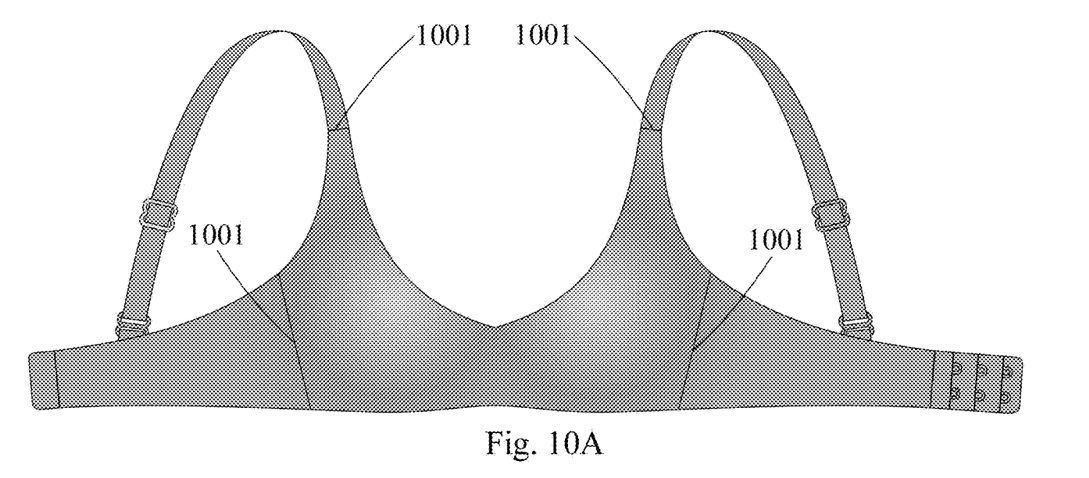
FIG. 10A shows the front view of a bra in accordance with an embodiment of the present invention.
Figure 10B:
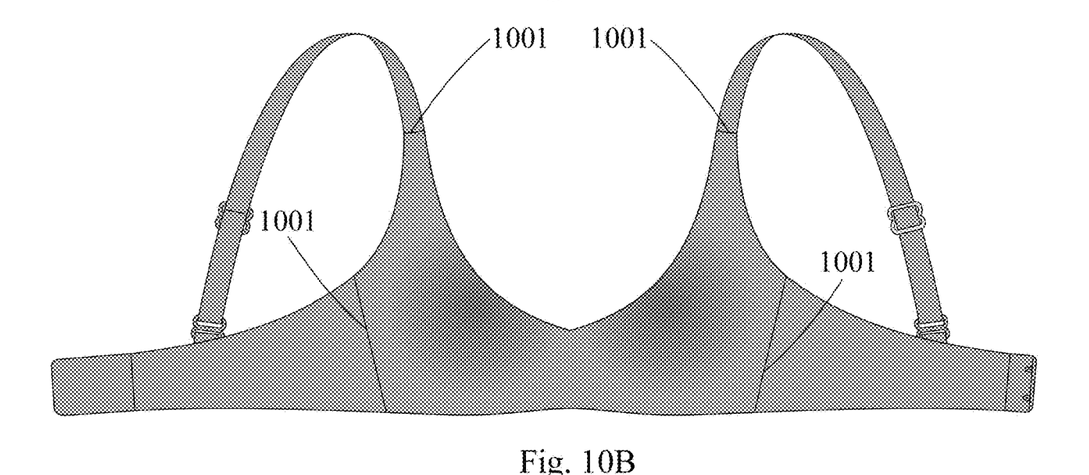
FIG. 10B shows the back view of the bra of FIG. 10A.

FIG. 7A illustrates a process for attaching an outer fabric layer to the trimmed assembly 610 as shown in FIG. 6A. As shown in the FIG. 7A, the trimmed assembly 610 and the outer fabric layer 101 are placed between the convex mold portion 201 and the concave mold portion 202, with the outer fabric layer 101 adjacent the concave mold portion 202 and the trimmed assembly 610 adjacent the convex mold portion 201. The extent of the outer fabric layer 101 is greater than the extent of the molded core assembly so that the entire core assembly comprising the two cup regions is within the boundaries of the outer fabric layer, and the same is also true of the inner fabric layer. Upon the application of heat and pressure, the adhesive present on the periphery on the outer side of the inner fabric layer 105 of the trimmed assembly 610 enables the outer fabric layer 101 to be affixed to the inner fabric layer 105 at locations where the adhesive is present, i.e. at the periphery of the inner fabric layer, to form the assembly 710 with the molded core assembly disposed completely between the outer fabric layer 101 and the inner fabric layer 105. A cross-sectional view of the assembly 710 along the line a-a is as shown in FIG. 8A. Other components such as side wings, shoulder straps, and fasteners may then be attached to the assembly 710, for example by sewing threads 901 or 1001, to form a bra top as shown in FIGS. 9A and 9B or a bra as shown in FIGS. 10A and 10B. In this embodiment, an example of which is as shown in FIGS. 9A and 9B and another example of which is as shown in FIGS. 10A and 10B, both the inner fabric layer 105 and the outer fabric layer 101 do not extend to include the side wings. The molded core assembly 302 is completely placed between the inner fabric layer 105 and the outer fabric layer 101. The molded core assembly 302 is affixed to the inner fabric layer 105 but not to the outer fabric layer 101. The molded core assembly 302 and the outer fabric layer 101 remain loose relative to each other. The molded core assembly 302 includes two cup regions, and does not extend to the side wing positions. As described above, the molded core assembly 302 includes a core fabric layer 103 on the convex outer side and a core foam layer 102 on the concave inner side. The core fabric layer 103 is laminated to the core foam layer 102. At a cup region of the molded core assembly, the core foam layer has a varying thickness which decreases from the central portion of the cup region to the periphery of the cup region, but has substantially the same density throughout. The concave surface of the core foam layer 102 is attached to the inner fabric layer 105. The attachment between the core foam layer 102 and the inner fabric layer 105 does not require an adhesive, but is achieved by a TPU film located between the core foam layer 102 and the inner fabric layer 105. That is, no adhesive is used to attach the inner fabric layer 105 to the core foam layer 102.

Figure 7B:
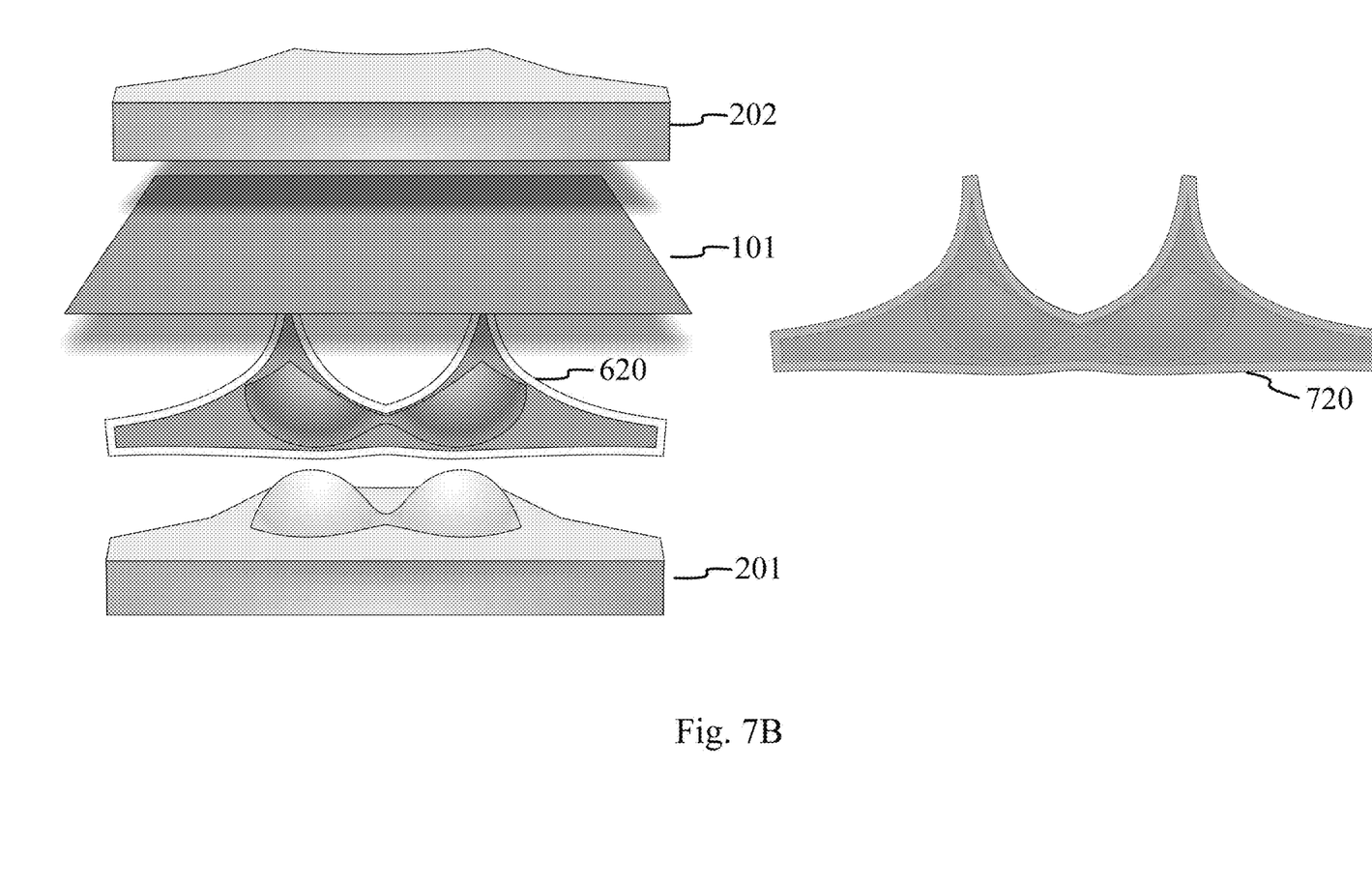
FIG. 7B illustrates a process of joining an outer fabric layer to the assembly of FIG. 6B in accordance with another embodiment of the present invention.
Figure 8B:
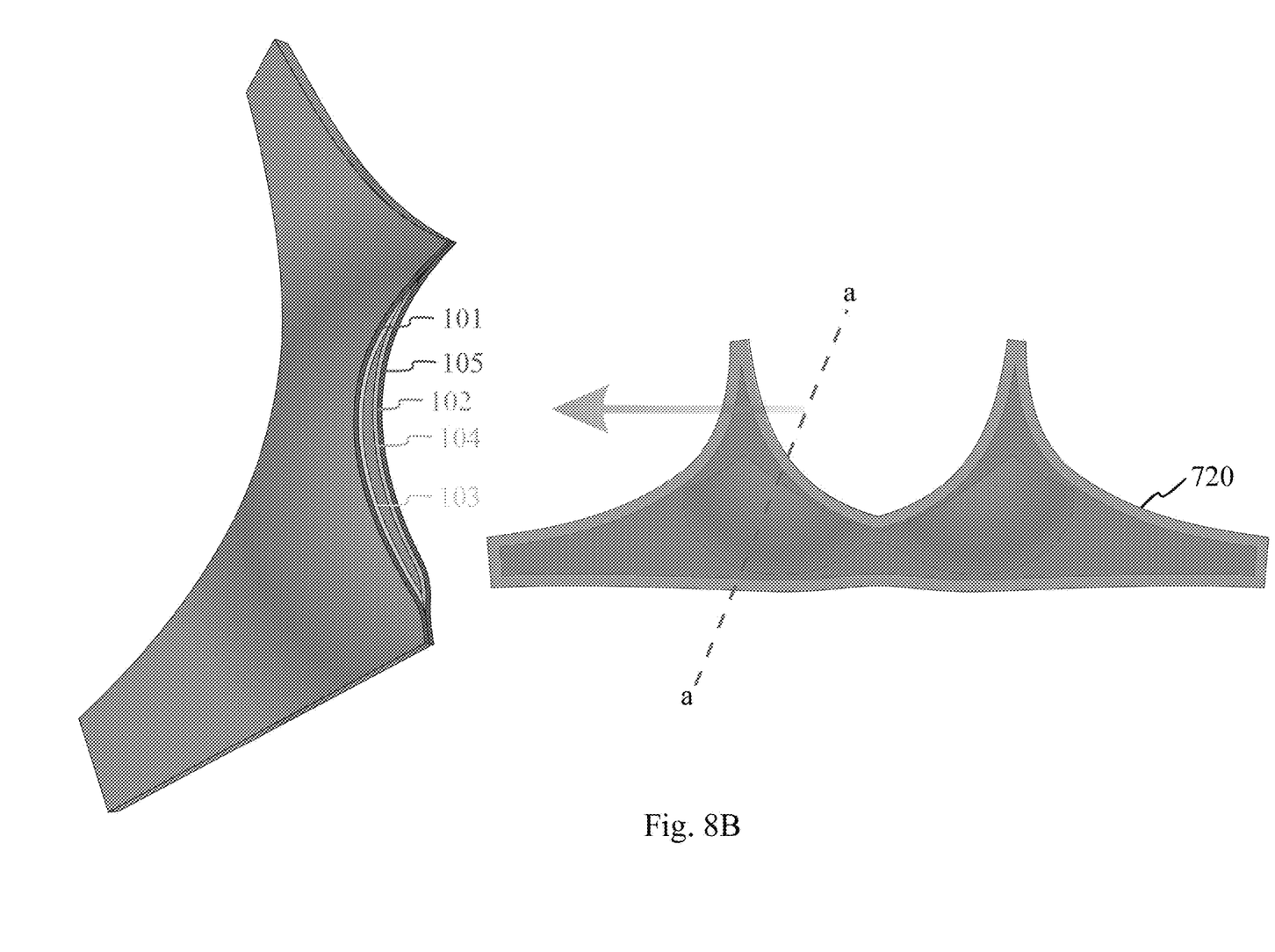
FIG. 8B shows a cross-sectional view along the line a-a of the assembly of FIG. 7B.
Figure 11A:
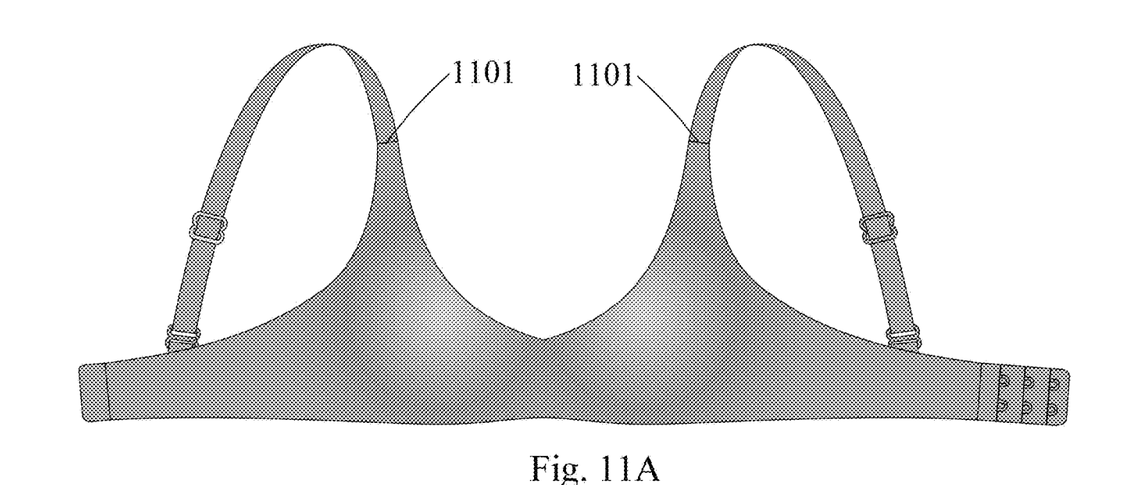
FIG. 11A shows the front view of a bra in accordance with another embodiment of the present invention.
Figure 11B:
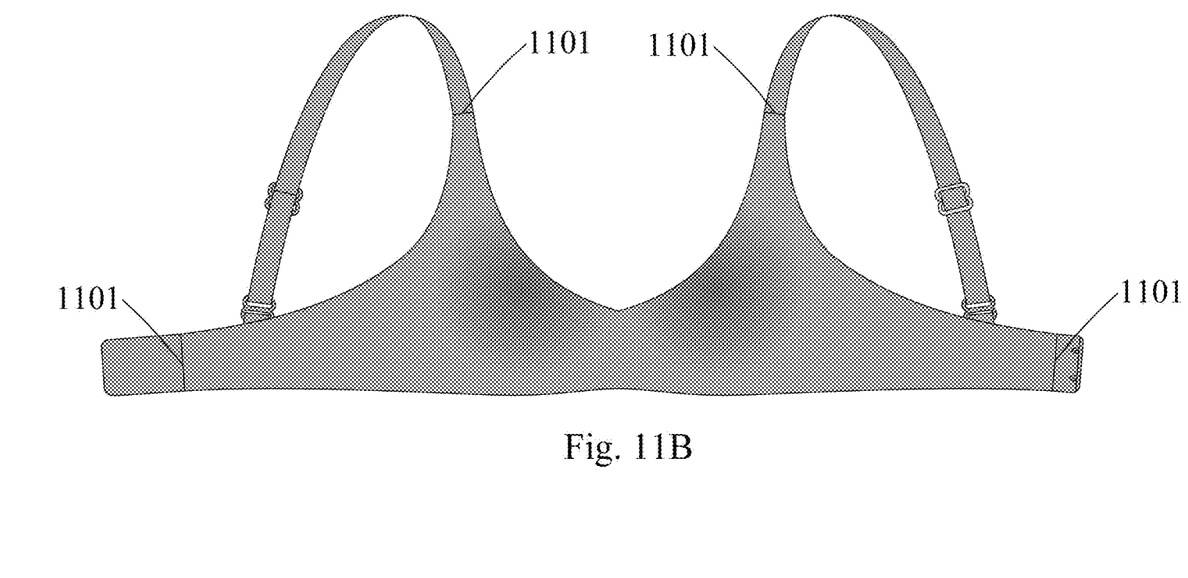
FIG. 11B shows the back view of the bra of FIG. 11A.

FIG. 7B illustrates a process for attaching an outer fabric layer to the trimmed assembly 620 as shown in FIG. 6B. As shown in the FIG. 7B, the trimmed assembly 620 and the outer fabric layer 101 are placed between the convex mold portion 201 and the concave mold portion 202, with the outer fabric layer 101 adjacent the concave mold portion 202 and the trimmed assembly 620 adjacent the convex mold portion 201. The extent of the outer fabric layer 101 is greater than the extent of the molded core assembly so that the entire core assembly comprising the two cup regions is within the boundaries of the outer fabric layer, and the same is also true of the inner fabric layer. Upon the application of heat and pressure, the adhesive present on the periphery on the outer side of the inner fabric layer 105 of the trimmed assembly 620 enables the outer fabric layer 101 to be affixed to the inner fabric layer 105 at locations where the adhesive is present, i.e. at the periphery of the inner fabric layer, to form the assembly 720 with the molded core assembly disposed completely between the outer fabric layer 101 and the inner fabric layer 105. Other components such as shoulder straps and fasteners may then be attached to the assembly 720, for example by sewing threads 1101, to form a complete bra as shown in FIGS. 11A and 11B. A cross-sectional view of the assembly 720 along the line a-a is as shown in FIG. 8B. In this embodiment, as shown in FIGS. 11A and 11B, both the inner fabric layer 105 and the outer fabric layer 101 extend long enough to include the side wings on both the left side and the right side. The molded core assembly 302 is completely placed between the inner fabric layer 105 and the outer fabric layer 101. The molded core assembly 302 is affixed to the inner fabric layer 105 but not to the outer fabric layer 101. The molded core assembly 302 and the outer fabric layer 101 remain loose relative to each other. The molded core assembly 302 includes two cup regions, and does not extend to the side wing positions. As described above, the molded core assembly 302 includes a core fabric layer 103 on the convex outer side and a core foam layer 102 on the concave inner side. The core fabric layer 103 is laminated to the core foam layer 102. At a cup region of the molded core assembly, the core foam layer has a varying thickness which decreases from the central portion of the cup region to the periphery of the cup region, but has substantially the same density throughout. The concave surface of the core foam layer 102 is attached to the inner fabric layer 105. The attachment between the core foam layer 102 and the inner fabric layer 105 does not require an adhesive, but is achieved by a TPU film located between the core foam layer 102 and the inner fabric layer 105. That is, no adhesive is used to attach the inner fabric layer 105 to the core foam layer 102.

In both embodiments, optionally, one or both of the inner fabric layer 105 and the outer fabric layer 101 may be further extended to include at least a portion of the shoulder strap. Preferably, both the inner fabric layer 105 and the outer fabric layer 101 are one-piece fabric layer. Preferably, the outer fabric layer 101 is not attached to the molded core assembly 302 except at the bridge or connecting region between the two cup regions of the molded core assembly. Alternatively, the outer fabric layer 101 is not attached to the molded core assembly 302 and remains loose relative to the molded core assembly.

In the embodiments of the present invention, the core foam layer forming the core assembly is precisely skived from an initial block of foam, so that the skived core foam layer helps determine the 3D shape of the molded core assembly. The substantially uniform density of the core foam layer throughout the cup region helps ensure substantially uniform hardness and hence hand feel of the cup region. Additionally, the precise skiving of the core foam layer helps ensure precise shaping of the cup regions. Comfort and aesthetics are thereby enhanced.

It should be appreciated that the above-described embodiments are provided by way of example only, and in alternative embodiments, some of the steps and components of the above-described embodiments may be modified or deleted without departing from the scope of the present invention. For example, in some embodiments, the core assembly may comprise only a core foam layer, or can include other materials suitable for forming cup core having substantially the same density. In some embodiments, a TPU film may not be provided between the core assembly and the inner fabric layer, but rather the two are joined by other means.

The invention claimed is:

1. A breast cup assembly comprising:
an outer fabric layer;
an inner fabric layer; and
a molded core assembly having two cup regions, the core assembly disposed between the outer and inner fabric layers, the core assembly comprising a core foam layer disposed on an inner side of the core assembly, the core foam layer laminated to a core fabric layer disposed on an outer side of the core assembly,
wherein the core foam layer at each of the two cup regions of the core assembly has a thickness that varies across the cup region and a density that is constant across the cup region, and
wherein the outer fabric layer and the inner fabric layer are affixed to each other at only each other's periphery.

2. The breast cup assembly as claimed in claim 1, wherein the thickness of each of the cup regions has a maximum thickness at a central portion of the cup region and a decreasing thickness that decreases from the central portion to a periphery of the cup region.

3. The breast cup assembly as claimed in claim 2, wherein the central portion is an apex of the cup region.

4. The breast cup assembly as claimed in claim 1, wherein an entire inner surface of the molded core assembly is affixed to the inner fabric layer.

5. The breast cup assembly as claimed in claim 1, further comprising a thermoplastic polyurethane (TPU) film disposed between the molded core assembly and the inner fabric layer, the TPU film being adapted to affix the core assembly to the inner fabric layer.

6. A breast cup assembly comprising:
an outer fabric layer;
an inner fabric layer; and
a molded core assembly having two cup regions, the core assembly disposed between the outer and inner fabric layers, the core assembly comprising a core foam layer disposed on an inner side of the core assembly, the core foam layer laminated to a core fabric layer disposed on an outer side of the core assembly,
wherein the core foam layer at each of the two cup regions of the core assembly has a thickness that varies across the cup region and a density that is constant across the cup region, and wherein the outer fabric layer and the molded core assembly are not affixed to each other.

7. A breast cup assembly comprising:
an outer fabric layer;
an inner fabric layer; and
a molded core assembly having two cup regions, the core assembly disposed between the outer and inner fabric layers, the core assembly comprising a core foam layer disposed on an inner side of the core assembly, the core foam layer laminated to a core fabric layer disposed on an outer side of the core assembly,
wherein the core foam layer at each of the two cup regions of the core assembly has a thickness that varies across the cup region and a density that is constant across the cup region, and
wherein the outer fabric layer and the molded core assembly are affixed to each other only at a bridge region between the two cup regions.

8. The breast cup assembly as claimed in claim 1, wherein the inner fabric layer comprises a one-piece fabric layer.

9. A brassiere comprising:
the breast cup assembly as claimed in claim 1 wherein the inner and outer fabric layers include side wings of the brassiere; and
fasteners attached to ends of the side wings.

10. A brassiere comprising:
the breast cup assembly as claimed in claim 1;
a side wing attached to either end of the breast cup assembly; and
fasteners attached to each side wing.

11. A bra top comprising:
a front portion comprising the breast cup assembly as claimed in claim 1; and
a back portion attached to the front portion.

12. A breast cup assembly comprising:
a first fabric layer;
a second fabric layer; and
a molded core assembly having two cup regions, the core assembly disposed between the first and second fabric layers, the core assembly comprising a core foam layer disposed on a first side of the core assembly, the core foam layer laminated to a core fabric layer disposed on a second side of the core assembly,
wherein the core foam layer at each of the two cup regions of the core assembly has a thickness that varies across the cup region and a density that is constant across the cup region, and
wherein the molded core assembly is affixed to one of the first and second fabric layers only at a bridge region between the two cup regions.

\* \* \* \* \*